(12) United States Patent
Ichizawa et al.

(10) Patent No.: US 9,291,953 B2
(45) Date of Patent: Mar. 22, 2016

(54) TRANSFER MEMBER, MANUFACTURING METHOD OF TRANSFER MEMBER, TRANSFER UNIT, IMAGE FORMING APPARATUS, AND ROLLER

(71) Applicant: FUJI XEROX CO., LTD., Tokyo (JP)

(72) Inventors: Nobuyuki Ichizawa, Kanagawa (JP); Masato Ono, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/449,561

(22) Filed: Aug. 1, 2014

(65) Prior Publication Data

US 2015/0205228 A1    Jul. 23, 2015

(30) Foreign Application Priority Data

Jan. 17, 2014   (JP) ................. 2014-006891
Jan. 17, 2014   (JP) ................. 2014-006892

(51) Int. Cl.
*G03G 15/16* (2006.01)
*B32B 27/08* (2006.01)
*B32B 27/40* (2006.01)
*B32B 25/08* (2006.01)
*B32B 25/14* (2006.01)
*B32B 25/20* (2006.01)
*B32B 27/28* (2006.01)
*B32B 27/30* (2006.01)
*B32B 27/32* (2006.01)
(Continued)

(52) U.S. Cl.
CPC ............. *G03G 15/162* (2013.01); *B32B 1/08* (2013.01); *B32B 25/08* (2013.01); *B32B 25/14* (2013.01); *B32B 25/20* (2013.01); *B32B 27/08* (2013.01); *B32B 27/281* (2013.01); *B32B 27/30* (2013.01); *B32B 27/32* (2013.01); *B32B 27/322* (2013.01); *B32B 27/36* (2013.01); *B32B 27/365* (2013.01); *B32B 27/40* (2013.01); *G03G 15/1685* (2013.01); *B32B 2255/10* (2013.01); *B32B 2255/26* (2013.01); *B32B 2307/202* (2013.01); *B32B 2307/51* (2013.01); *B32B 2307/554* (2013.01); *G03G 15/1605* (2013.01); *G03G 15/167* (2013.01); *G03G 15/1675* (2013.01); *G03G 2215/0132* (2013.01); *G03G 2215/1614* (2013.01); *Y10T 428/265* (2015.01); *Y10T 428/269* (2015.01)

(58) Field of Classification Search
CPC ........................................... G03G 15/16
USPC ....................................... 399/313
See application file for complete search history.

(56) References Cited

U.S. PATENT DOCUMENTS

| 6,035,172 A * | 3/2000 | Mimura et al. ........... 399/286 |
| 2004/0042824 A1 * | 3/2004 | Saito ..................... 399/302 |
| 2005/0095437 A1 * | 5/2005 | Furuya et al. ............ 428/423.1 |

(Continued)

FOREIGN PATENT DOCUMENTS

| JP | 10-111599 | * 4/1998 | ............ G03G 15/08 |
| JP | A-10-111599 | 4/1998 | |

(Continued)

*Primary Examiner* — Clayton E Laballe
*Assistant Examiner* — Kevin Butler
(74) *Attorney, Agent, or Firm* — Oliff PLC

(57) ABSTRACT

A transfer member includes a support, an elastic layer, and a resin layer having a sea-island structure on the elastic layer, wherein elongation at break of the resin layer is from 20% to 180%, and an average diameter of an island portion thereof is from 0.5 μm to 3 μm.

13 Claims, 4 Drawing Sheets

(51) Int. Cl.
*B32B 27/36* (2006.01)
*B32B 1/08* (2006.01)

(56) References Cited

U.S. PATENT DOCUMENTS

| | | | |
|---|---|---|---|
| 2010/0124641 A1* | 5/2010 | Mikashima et al. | 428/206 |
| 2010/0247171 A1* | 9/2010 | Ono et al. | 399/302 |
| 2010/0303520 A1* | 12/2010 | Miyauchi et al. | 399/320 |
| 2011/0013939 A1* | 1/2011 | Ono | 399/176 |
| 2011/0194882 A1* | 8/2011 | Kitano et al. | 399/333 |
| 2012/0129667 A1* | 5/2012 | Mizumoto et al. | 492/18 |
| 2013/0216279 A1* | 8/2013 | Matsunaga | 399/286 |

FOREIGN PATENT DOCUMENTS

| | | | | |
|---|---|---|---|---|
| JP | A-2010-122314 | | 3/2010 | |
| JP | 2011-180202 | * | 9/2011 | G03G 15/20 |

* cited by examiner

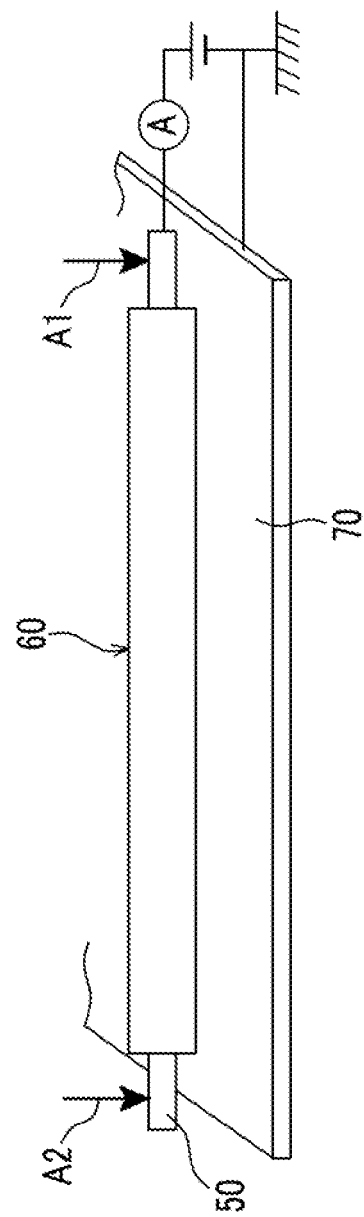

TRANSFER MEMBER, MANUFACTURING METHOD OF TRANSFER MEMBER, TRANSFER UNIT, IMAGE FORMING APPARATUS, AND ROLLER

CROSS-REFERENCE TO RELATED APPLICATIONS

This application is based on and claims priority under 35 USC 119 from Japanese Patent Application Nos. 2014-006391 and 2014-006892, filed Jan. 17, 2014.

BACKGROUND

Technical Field

The present invention relates to a transfer member, a manufacturing method of a transfer member, a transfer unit, an image forming apparatus, and a roller.

SUMMARY

According to an aspect of the invention, there is provided a transfer member including:

a support;

an elastic layer; and a resin layer having a sea-island structure on the elastic layer, wherein elongation at break of the resin layer is from 20% to 180%, and an average diameter of an island portion thereof is from 0.5 µm to 3 µm.

BRIEF DESCRIPTION OF THE DRAWINGS

Exemplary embodiments of the present invention will be described in detail based on the following figures, wherein:

FIG. 5 is an explanatory view for illustrating a measurement method of a volume electric resistance value of a secondary transfer roller of Examples.

DETAILED DESCRIPTION

Figure 1A:
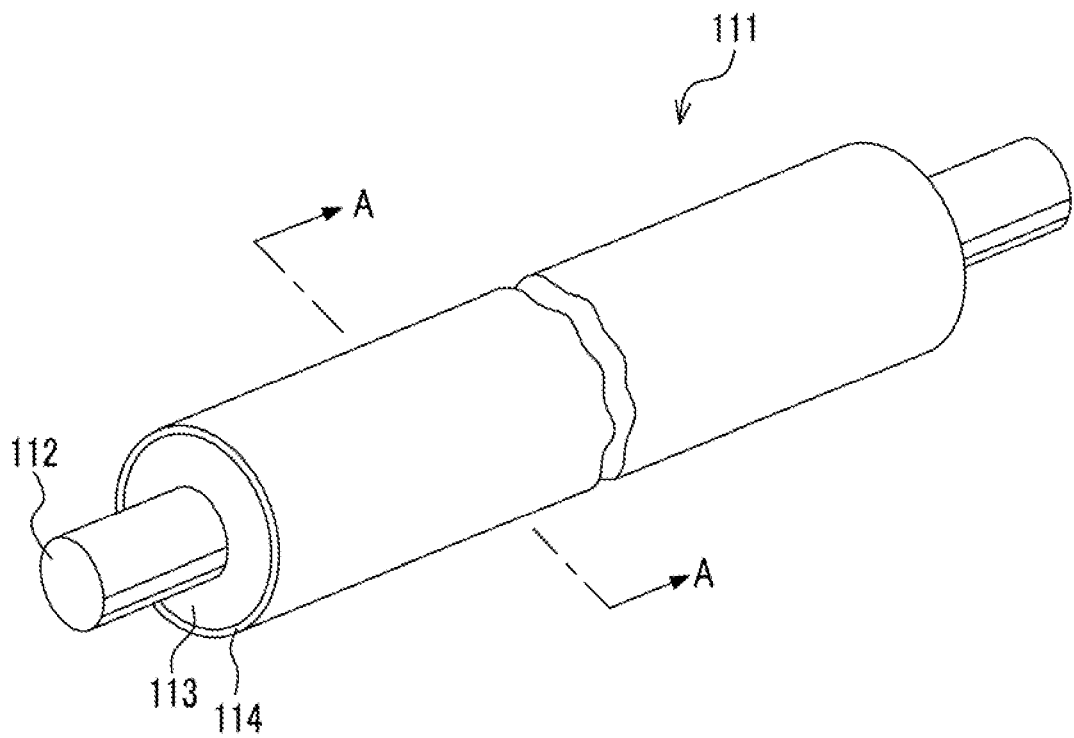
FIG. 1A is a schematic perspective view showing a transfer roller according to the exemplary embodiment.

Hereinafter, exemplary embodiments as an example of the present invention will be described with reference to the drawings.

Transfer Member

A transfer member according to the exemplary embodiment includes an elastic layer, and a resin layer having a sea-island structure in which a diameter of an island portion is from 0.5 µm to 3 µm and in which elongation at break is from 20% to 180%, on a support in this order.

A secondary transfer roller as an example of the transfer member has a configuration of including the resin layer on the elastic layer, in order to prevent the back surface of a recording medium (hereinafter, also may be referred to as a "sheet") from becoming dirty due to transfer of toner remaining on an intermediate transfer member and in order to prevent ozone degradation of the elastic layer.

In such a secondary transfer roller, the resin layer is unlikely to follow deformation of the elastic layer which is a lower layer, and after continuous use, cracks (fissure or cracking) are generated, and the original function of the secondary transfer roller may be degraded. Accordingly, a method of applying flexibility with respect to the resin layer is used in some cases, in order to obtain an excellent following property thereof for deformation of the elastic layer.

Meanwhile, the surface of the secondary transfer roller is cleaned with a blade in order to remove toner transferred from the intermediate transfer member, but if the flexibility of the resin layer is high, adhesiveness of the surface of the roller and the blade increases, and the blade turned-up may occur.

That is, when the resin layer of the secondary transfer roller is set to have flexibility for suppressing generation of cracks, the blade turned-up at the time of cleaning occurs, and it is difficult to suppress both the generation of cracks and the blade turned-up.

Since the resin layer of the transfer member according to the exemplary embodiment has the sea-island structure in which the diameter of the island portion is from 0.5 µm to 3 µm and in which elongation at break is from 20% to 180%, it is possible to suppress the generation of cracks while maintaining surface hardness for suppressing the blade turned-up.

An action for obtaining such effects is not clear but is assumed as follows.

The diameter of the transfer member decreases due to the presence of the elastic layer when the transfer member is pressed by a sheet edge or a counter member, and volume of the member corresponding to the decreased amount is exposed to the outside of the pressed portion to foe a swollen portion (also referred to as a bulge). At that time, the resin layer of the swollen portion is elongated, and with the repeating of this operation, cracks are generated due to elongation and contraction of the resin layer.

In the resin layer of the transfer member according to the exemplary embodiment, the scattered island port ion absorbs volume change when the transfer member is pressed by a sheet edge or a counter member and decreases its volume, and accordingly it is possible to decrease bulge in the outside of the pressed portion (same principle as a foaming material). In addition, it is possible to maintain surface hardness capable of suppressing the blade turned-up for the entire resin layer, due to the presence of the sea portion harder than the island portion.

Therefore, it is possible to reduce elongation of resin layer due to bulging and suppress the generation of cracks, while suppressing the blade turned-up and maintaining high cleaning performance.

As described above, the problems occurring in the secondary transfer roller are shown as the examples, but the exemplary embodiment is not limited thereto, and if a primary transfer roller of an intermediate transfer system image forming apparatus or a transfer roller of a direct transfer system image forming apparatus has the problems described above, the transfer member according to the exemplary embodiment may be employed to address such problems.

In addition, in the same manner as described above, even if the transfer member has a shape of a belt member, when the transfer member has the problems described above, the transfer member according to the exemplary embodiment may be employed to address such problems.

In the transfer member according to the exemplary embodiment, an "outermost surface" may be a surface formed of the resin layer described above, or may be a surface formed of a resin surface layer provided on this resin layer which will be described below.

Resin Layer

First, the resin layer will be described.

As described above, the resin layer has the sea-island structure in which the diameter of the island portion is from 0.5 µm to 3 µm and in which elongation at break is from 20% to 180%.

Such conditions are satisfied, and thus it is possible to suppress both the generation of cracks and the blade turned-up.

When the diameter of the island portion is smaller than 0.5 µm, flexibility is not sufficiently applied to the resin layer, and accordingly it is difficult to adjust the elongation at break of the resin layer in the range described above.

In addition, when the diameter of the island portion exceeds 3 µm, conductive materials (for example, carbon black) contained in the resin layer tend to be easily aggregated, and accordingly, electric resistance may decrease and performance as the transfer member may be decreased. The reason therefor is considered to be as follows. The resin layer of the exemplary embodiment tends to be unevenly located around an outer periphery of the island portion in the sea portion, and if the diameter of the island portion increases, the conductive materials approach each other and are in an aggregated state.

When the elongation at break exceeds 180%, the flexibility of the resin layer increases, and accordingly the blade turned-up occurs, and when the elongation at break is less than 20%, cracks are easily generated.

It is more preferable that the diameter of the island portion of the resin layer be from 1 µm to 3 µm.

In addition, it is more preferable that the elongation at break of the resin layer be from 50% to 150%.

Herein, the diameter of the island portion of the resin layer indicates an average value of maximum diameter of the island portion measured as follows.

A section of a measurement specimen in a radial direction (thickness direction) is cut out with a single-edged razor blade, the cut-out section is subjected to ion etching with an Argon gas plasma process, and then the section is observed with a SEM.

The ion etching is performed with power of 10 W for the processing time of 8 minutes, using RF Plasma Barrel Etcher PT7160 manufactured by Quorum Technologies, and a measurement sample is manufactured.

The observation with the SEM is performed at an accelerating voltage of 5 kV in an observation mode of a secondary electron image (SET), by using JSM-6700F manufactured by JEOL Ltd.

The elongation at break of the resin layer is measured as follows.

First, a single film of the resin layer is manufactured and the measurement sample is obtained.

The single film of the resin layer is manufactured by forming a coated film on a commercially available resin sheet using a coating solution for a resin layer formation, by a well-known method such as wire bar coating or spray coating, and drying the coated film. The obtained single film is peeled off from the resin sheet and is used as a measurement sample. PET, polyimide, a PTFE sheet, a fluorine resin, or the like is used as the resin sheet.

In addition, since adhesiveness of the film and the resin increases and the peeling is difficult, depending on the thickness of the resin layer, the coating solution for a resin layer formation may be applied to a rubber sheet, instead of the resin sheet, to manufacture a laminated measurement sample obtained by combining the rubber sheet and the resin layer, and this sample may be measured. A material having greater elongation value than the resin layer is preferably used for the rubber sheet used herein, and the commercially available rubber sheet is used. Examples of specific material include chloroprene rubber, nitrile rubber, ethylene-propylene rubber, and the like.

In the exemplary embodiment, a measurement sample and a test piece are manufactured as follows, and a tensile test is performed under the following measurement conditions. The break of the resin layer is visually checked, and value variation of an S-S (stress-strain) curve (noise at break) is also evaluated as the elongation at break.

An ethylene-propylene rubber sheet (thickness of 500 µm) is used as the rubber sheet, and the coating solution for resin layer formation is applied thereon by the spray coating, and then firing is performed at 140° C. for 20 minutes, and a resin layer having a thickness of 14 µm is formed, to manufacture the measurement sample.

This measurement sample is cut out to have a width of 5 mm and a length of a measurement part of 40 mm, and this is set as a test piece.

The tensile test is performed under the following conditions, by using this test piece.

Device: Tensile tester MODEL-1605N manufactured by AIKOH ENGINEERING CO., LTD.

Measurement conditions: speed of 10 mm/min

Test environment: Laboratory environment at 23° C.±5° C.

The resin layer is only cut out from the manufactured transfer member, and the elongation at break may be measured under the conditions described above.

The content ratio of the island portion of which the diameter is from 0.5 µm to 3 µm in the resin layer, is not particularly limited, as long as the elongation at break described above may be achieved, however, in detail, the content ratio thereof is preferably in a range of 5 volume % to 25 volume % and is more preferably in a range of 10 volume % to 20 volume %, with respect to the entire resin layer, for example.

The content ratio of the island portion is acquired by performing image analysis of an occupied area of the island portion from an SEM image and performing volume conversion by assuming the shape of the occupied area as a sphere.

In addition, the thickness of the resin layer may be selected according to the exemplary embodiment of the transfer member, however, the thickness thereof is, for example, preferably from 5 µm to 40 µm and more preferably from 10 µm to 30 µm, in order to realize functions such as securing surface smoothness for preventing the back surface of a sheet from becoming dirty due to transfer of toner or preventing ozone degradation of the elastic layer, and for abrasion resistance of the layer (prevention of malfunction due to removal of the film).

Next, a formation method of the resin layer will be described.

The method of forming the resin layer described above is not particularly limited, and the following method using a curable resin is preferable, from the viewpoint of ease of manufacturing.

That is, the method is a method (manufacturing method of the transfer member according to the exemplary embodiment) using a base resin (curable resin) and two or more kinds of isocyanate compounds (curing agents).

That is, the resin layer of the exemplary embodiment preferably has a sea-island structure formed of a reaction product of the curable resin and two or more kinds of isocyanate compounds (preferably containing at least two or more kinds of isocyanate compounds having different compatibilities with respect to the curable resin or a solvent).

The method will be described in detail.

The method includes at least a coating step of applying a coating solution containing the curable resin and two or more kinds of isocyanate compounds on the elastic layer, and a drying step of drying the coated film while controlling a drying rate of the coated film obtained in the coating step.

The curable resin used in the coating step may be a resin including a functional group which may react with an isocyanate group in the isocyanate compound which is a curing agent.

Examples of such a resin including a functional group which may react with an isocyanate group include polyols such as acrylic polyols, polyester polyols, polyether polyols, polycarbonate polyols, polycaprolactone polyols, or polyolefin polyols including a hydroxyl group in a molecule. In addition, a fluoroolefin copolymer (for example, a tetrafluoroethylene-vinyl monomer copolymer, a tetrafluoroethylene-alkyl vinyl ether copolymer, or the like), or a vinyl fluoride copolymer may foe used, for example, in order to improve the functions.

Preferable commercially available products as the curable resin include ZEFFLE GK 570 manufactured by DAIKIN INDUSTRIES, Ltd., LUMIFLON manufactured by Asahi Glass Co., Ltd., and the like.

As the isocyanate compound used in the coating step, the well-known curing agent is used, and specific examples thereof include an isocyanurate trimer of hexamethylene diisocyanate (HDI) (commercially available product: "TAKENATE D-170N (manufactured by Mitsui Takeda Chemicals Inc.)" or "Sumidur N3300 (manufactured by Sumika Bayer CO., Ltd.)"), an isocyanurate trimer of isophorone diisocyanate (IPDI) (commercially available product; "T1890 (manufactured by Evonik Degussa GmbH)"), a mixed isocyanurate trimer of HDI and tolylene diisocyanate (TDI) (commercially available product: "Desmodur HL (manufactured by Sumika Bayer CO., Ltd.)"), other isocyanurate trimer (commercially available product: "DURANATE TKA-100 (manufactured by Asahi Kasei Corporation)", "DURANATE TPA-100 (manufactured by Asahi Kasei Corporation)"), diphenyl methane diisocyanate (MDI), an adduct product (commercially available product: "DURANATE E402-80B (manufactured by Asahi Kasei Corporation)"), a biuret product (commercially available product: "DURANATE 22A-75P" or "DURANATE 21S-75E"), and the like.

The coating solution used in the coating step includes two or more kinds of the isocyanate compounds described above, and a desirable sea-island structure may be formed by combining the isocyanate compounds and adjusting a mixing ratio and the like.

As the combination of the isocyanate compounds, combination including at least two different isocyanate compounds having different compatibilities with respect to the curable resin or the solvent coexisting in the coating solution is preferable, from a viewpoint of formation of the sea-island structure, and a combination including at least two different isocyanate compounds having different compatibilities with respect to the solvent is particularly preferable.

Examples of the preferable combination include combination of "DURANATE 22A-75P" and "DURANATE E405-70B", combination of "DURANATE 21S-75E" and "DURANATE E405-70B", combination of "DURANATE TPA-100" and "DURANATE E402-80B", and the like.

The resin (polyol) including a functional group which may react with an isocyanate group and the isocyanate compound (curing agent) may preferably be mixed at a combination ratio so that a molar ratio (NCO/OH, R value) of the isocyanate group (NCO group) with respect to a hydroxyl group (OH group) in the resin, (polyol) is in a range of 0.7 to 1.5, preferably in a range of 0.9 to 1.3, and more preferably in a range of 1.0 to 1.1.

Examples of the solvent used in the coating step include butyl acetate, ethyl acetate, butanol, and the like.

Among them, butyl acetate and ethyl acetate are preferable from the viewpoint of resin solubility and volatility.

The content of the solvent in the coating solution may be adjusted to control the drying time (time when the coated film is wet).

In addition, for the coating solution used in the coating step, a conductive material (carbon black or the like) for applying conductivity is preferably used.

Herein, examples of the conductive material used in the resin layer include an electron conductive material, an ion conductive material, and the like. The conductive materials axe the same as the conductive materials which will be described in a part of an elastic layer 113.

In addition, the coating solution may contain additives for control of physical properties, such as a surfactant, a foam stabilizer, a defoaming agent, a flame retardant, a plasticizer, a softener, an antioxidant, a pigment, a dye, a stabilizer, a bacteriostatic agent, filler, and the like, in addition to a reaction inhibitor and a metal catalyst.

In the coating step, the components described above are dissolved and dispersed in a solvent to prepare the coating solution, and this coating solution is applied onto the elastic layer.

Herein, in the preparation of the coating solution, a collision type disperser such as a jet mill or a homogenizer may preferably be used from the viewpoint of increasing dispersibility of the conductive material (carbon black).

In the coating step, the well-known coating method may be applied depending on the embodiment of the transfer member (for example, the belt member or the roller member), and for example, a flow coating method, a dip coating method, a spray coating method, an ink jet method, or the like is appropriately used, from the viewpoint of a film forming property, a used amount of the coating solution, and productivity.

In the drying step after the coating step, the coated film obtained in the coating step is dried while controlling the drying rate.

In this step, the drying rate employed until the coated film is dried is controlled. That is, in this step, the size of the island portion is adjusted by controlling the length of the time when the coated film is wet.

As the time when the coated film is wet is long, the size of the island portion tends to increase, and as the time when the coated film is wet is short, the size of the island portion tends to decrease.

For controlling the drying rate, a method of adjusting the amount of solvent in the coating solution (that is, amount of solvent in the coated film) is used.

In a case of this method, even in the environment where the drying conditions (temperature or humidity) are constant, the drying rate of the coated film may be controlled by increasing or decreasing the amount of the solvent in the coating solution.

Meanwhile, in this step, the drying conditions may be changed to control the drying rate.

At the time of the drying step, heat drying or air drying or combination thereof may be used, and the drying rate of the coated film may be controlled by suitably selecting and adjusting the conditions at the time of drying, that is, a temperature, humidity, and air volume, airflow conditions, and air humidity (moisture content) in a case of the air drying.

Firing may be performed with respect to the resin layer after the drying step, if necessary.

Resin Surface Layer

The transfer member according to the exemplary embodiment may further include a resin surface layer on the resin layer. In a case of including the resin surface layer, this resin surface layer forms an "outermost surface" of the transfer member.

This resin surface layer is preferably formed of (1) a resin surface layer which does not have a sea-island structure, or (2) the resin surface layer having the sea-island, structure in which the diameter of the island portion is from 0.3 µm to 0.5 µm.

In the resin layer described above, the diameter of the island portion is from 0.5 µm to 3 µm. By including the island portion having such a diameter, discharge on the outermost surface may occur and the electric resistance may decrease.

Therefore, by including such a resin surface layer described above, discharge on the outermost surface due to the size of the diameter of the island portion is unlikely to occur and a decrease of electric resistance may be suppressed, as a result, degraded image quality due to the decrease of the electric resistance may be suppressed.

Herein, in (2) the resin surface layer having the sea-island structure, the measurement method of the diameter of the island portion is the same method used in the resin layer described above.

In a case where the resin surface layer is (2) the resin surface layer having the sea-island structure, in addition to the configuration of the range of the diameter of the island portion, the resin surface layer preferably has the same configuration as the resin layer described above, from viewpoints of adhesiveness between layers, wettability, and coated film evenness, that is the configuration of including the resin material, the conductive material, and additives if necessary.

In addition, the manufacturing method of (2) the resin surface layer having the sea-island structure is not particularly limited, and the method using the base resin (curable resin) mainly forming the sea portion and two or more kinds of isocyanate compounds (curing agents) mainly forming the island portion described above may be applied and the conditions capable of decreasing the diameter of the island portion may be selected.

In (2) the resin surface layer having the sea-island structure, the content ratio of the island portion the diameter of which is from 0.3 µm to 0.5 µm is preferably in a range of 5 volume % to 25 volume %, and is more preferably in a range of 10 volume % to 20 volume %, with respect to the entire resin layer, for example.

A thickness of (2) the resin surface layer having the sea-island structure is preferably from 1 µm to 3 µm and more preferably from 2 µm to 3 µm, for example, from the viewpoint of abrasion resistance.

Meanwhile, in a case where the resin surface layer is (1) the resin surface layer which does not have the sea-island structure, there is no limitation for such a resin surface layer, but it is preferable to have the configuration including the resin material, the conductive material, and additives if necessary.

Examples of the resin material used in (1) the resin surface layer which does not have the sea-island structure include an acrylic resin, a cellulose resin, a polyamide resin, copolyamide, a polyurethane resin, a polycarbonate resin, a polyester resin, a polyethylene resin, a polyvinyl resin, a polyarylate resin, a styrene-butadiene resin, a melamine resin, an epoxy resin, a urethane resin, a silicone resin, a fluorine resin (for example, a tetrafluoroethylene perfluoroalkyl vinyl ether copolymer, a tetrafluoroethylene-hexafluoropropylene copolymer, or polyvinylidene fluoride), a urea resin, and the like. The resin material may be a material obtained by curing the curable resin with a curing agent.

Herein, the copolyamide includes any one or plural kinds from 610 nylon, 11 nylon, and 12 nylon as a polymerization unit, and the other polymerization units included in this copolymer are 6 nylon, 66 nylon, and the like.

For the conductive material or the other additives used in (1) the resin surface layer which does not have the sea-island structure, the conductive material or the additives used in the resin layer described above are used.

Herein, (1) the resin surface layer which does not have the sea-island structure is preferably a resin surface layer obtained from a composition including a curable resin, a curing agent, and carbon black, and particularly preferably a resin surface layer configured with a cured film of a composition including a resin (curable resin) including a functional group which may react with an isocyanate group, an isocyanate curing agent, and carbon black, from the viewpoint of suppressing both adhesiveness with the resin layer which is a lower layer and generation of cracks and scratches.

As the curable resin and the curing agent (isocyanate curing agent), the curable resin and the isocyanate compounds used when forming the resin layer described above are used.

Herein, the resin (curable resin) including a functional group which may react with an isocyanate group and the isocyanate curing agent may preferably be mixed at a combination ratio so that a molar ratio (NCO/OH, R value) of the isocyanate group (NCO group) with respect to a hydroxyl group (OH group) in the resin (polyol) is in a range of 0.7 to 1.5, preferably in a range of 0.9 to 1.3, and more preferably in a range of 1.0 to 1.1.

(1) The resin surface layer which does not have the sea-island structure is formed by dissolving and dispersing each component in a solvent to prepare the coating solution, applying this coating solution onto the resin layer, and drying and firing (curing) the layer if necessary.

Herein, in the preparation of the coating solution, a collision type dispenser such as a jet mill or a homogenizer may preferably be used from the viewpoint of increasing dispersibility of the conductive material (carbon black).

As the solvent used in the coating solution, the solvent used in the coating solution for formation of the resin layer described above is used.

A thickness of (1) the resin surface layer which does not have the sea-island structure is preferably from 1 µm to 3 µm and more preferably from 1 µm to 2 µm, from the viewpoint of suppressing generation of cracks.

Young's Modulus

A Young's modulus of the outermost surface of the transfer member according to the exemplary embodiment is preferably from 100 MPa to 600 MPa.

The Young's modulus of the outermost surface is more preferably from 150 MPa to 550 MPa and even more preferably from 150 MPa to 500 MPa.

Herein, the Young's modulus is a value obtained from inclination of an S-S curve at the time of unloading of an indentation rate of 70%, under the measurement conditions of a test load of 0.2 mgf (19.6 mN) and a loading rate of 0.0284 mN/sec using a triangular-pyramid indenter with a ridge angle of 115°, with Shimadzu dynamic ultra-microhardness tester DUH 201S, with respect to the outermost surface of the transfer member.

In the exemplary embodiment, the Young's modulus is a value measured with respect to the outer most surface obtained by coating the single layer of the resin layer or the laminated body of the resin layer and the resin surface layer, using an elastic layer-attached roller (base rubber roller) or rubber sheet adjusted to Aster C type hardness of 90° as a standard base material, in order to remove an effect of the elastic layer (base rubber).

In a case of the single layer of the resin layer, the Young's modulus is adjusted by the configuration components or the formation method (firing time and firing temperature) of the resin layer, the diameter of the island portion, the amount of the island portion, and the like.

In a case of the laminated body of the resin layer and the resin surface layer, the Young's modulus is adjusted by the configuration components or the formation method (firing time and firing temperature), the diameter of the island portion, the amount of the island portion, and the like of the resin layer, in addition to the configuration components or the formation method (firing time and firing temperature) of the resin surface layer, the diameter of the island portion, the amount of the island portion, and the thickness of the resin surface layer.

The transfer member according to the exemplary embodiment may include the resin layer described above, and may have a roller shape or a belt shape.

The transfer member according to the exemplary embodiment is preferably used, as in the image forming apparatus, a secondary transfer unit which is cleaned by a blade but may be used, as a primary transfer unit.

Hereinafter, a case where the transfer member according to the exemplary embodiment is a secondary transfer roller will be described in detail with reference to FIGS. 1A to 2B.

Figure 1B:
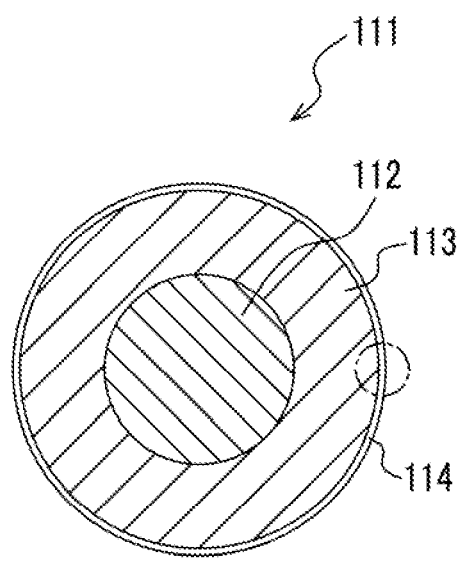
FIG. 1B is a cross-sectional view taken along line A-A of FIG. 1A.
Figure 2A:
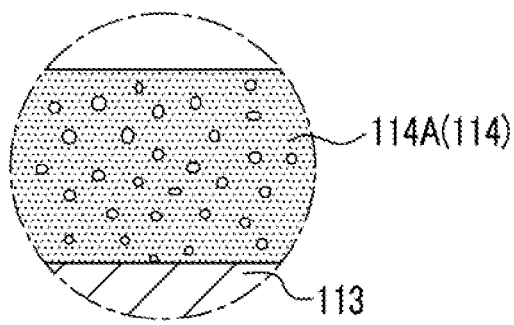
FIGS. 2A and 2B axe enlarged views of a main, part of a portion surrounded with a dotted line of the cross-sectional view of FIG. 1B.
Figure 2B:
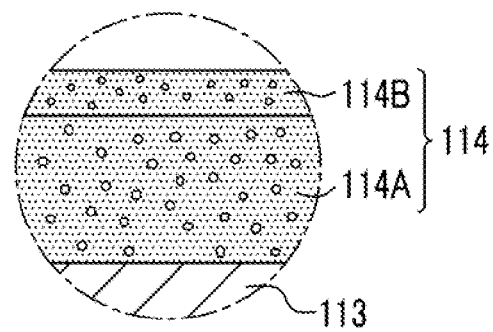

FIG. 1A is a schematic perspective view showing the transfer roller according to the exemplary embodiment, and FIG. 1B is a cross-sectional view taken along line A-A of FIG. 1A. FIGS. 2A and 2B are enlarged views of a main part of a portion surrounded with a dotted line of the cross-sectional view of FIG. 1B.

Secondary Transfer Roller

As shown in FIGS. 1A and 1B, a secondary transfer roller 111, for example, includes a support 112, an elastic layer 113 provided on the support, and a surface layer 114 provided on the elastic layer.

Herein, as shown in FIG. 2A, the surface layer 114 is a single layer of a resin layer 114A described above, or a laminated body of the resin layer 114A and a resin surface layer 114B described above.

In FIG. 2B, the resin surface layer 114B has a sea-island structure, but of course may be a resin layer which does not have a sea-island structure.

Support

The support 112 is a conductive member which functions as an electrode and a supporting member of the secondary transfer roller 111.

As the support 112, a member of metal such as iron (free-cutting steel), copper, brass, stainless steel, aluminum, or nickel is used, for example.

In addition, as the support 112, a member an outer surface of which is subjected to plating (for example, resin or ceramic member), a member in which a conductive material is dispersed (for example, resin or ceramic member), or the like is used, for example.

The support 112 may be a hollow member (tubular member) or may foe a non-hollow member.

Elastic Layer

The elastic layer 113 is a conductive layer and includes a rubber material (elastic material), for example, and may include a conductive material or the other additives. The elastic layer 113 may be a conductive foaming elastic layer or may be a conductive non-foaming elastic layer, but the elastic layer is preferably a non-foaming elastic layer from the viewpoint of preventing infiltration of the coating solution into the elastic layer when forming the resin layer.

As the rubber material (elastic material), at least an elastic material having double bond in a chemical structure is used, for example.

Specific examples of the rubber material include isoprene rubber, chloroprene rubber, epichlorohydrin rubber, butyl rubber, polyurethane, silicone rubber, fluorine rubber, styrene-butadiene rubber, butadiene rubber, nitrite rubber, ethylene-propylene rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer rubber (NBR), natural rubber, and rubber obtained by mixing these materials.

Among these rubber materials, polyurethane, EPDM, epichlorohydrin-ethylene oxide copolymer rubber, epichlorohydrin-ethylene oxide-allyl glycidyl ether copolymer rubber, NBR, and rubber obtained by mixing these materials are preferably used.

The conductive material is used when conductivity of the rubber material is low or when the rubber material does not have conductivity. As the conductive material, an electron conductive material or an ion conductive material is used.

Examples of the electron conductive material include powder of carbon black such as Ketjen black or acetylene black; thermal decomposition carbon or graphite; various conductive metals or alloys such as aluminum, copper, nickel, or stainless steel; various conductive metal oxides such as tin oxide, indium oxide, titanium oxide, a tin oxide-antimony oxide solid solution, or a tin oxide-indium oxide solid solution; a material obtained by performing conductive process of a surface of an insulating material; and the like.

Herein, specific examples of carbon black include "Special Black 350", "Special Black 100", "Special Black 250", "Special Black 5", "Special Black 4", "Special Black 4A", "Special Black 550", "Special Black 6", "Color Black FW200", "Color Black FW2", and "Color Black FW2V" all manufactured by Evonik Degussa GmbH, "MONARCH 1000", "MONARCH 1300", "MONARCH 1400", "MOGUL-L", AND "REGAL 400R" all manufactured by Cabot Corporation.

The electron conductive material may be used alone or may be used in combination of two or more kinds.

Content of the electron conductive material is preferably from 1 part by weight to 30 parts by weight and more preferably from 15 parts by weight to 25 parts by weight, with respect to 100 parts by weight of the rubber material, for example.

Examples of the ion conductive material include quaternary ammonium salt (for example, lauryl trimethyl ammonium, stearyl trimethyl ammonium, octadecyl trimethyl ammonium, dodecyl trimethyl ammonium, hexadecyl trimethyl ammonium, perchlorate such as modified fatty acid-.dimethyl ethyl ammonium, chlorate, fluoroborate, sulfate, ethosulfate salt, benzyl halide salt (for example, benzyl bromide salt, benzyl chloride salt, and the like)), and the like, aliphatic sulfonic acid salts, higher alcohol sulfuric ester salts, higher alcohol ethylene oxide adduce sulfuric acid ester salts, higher alcohol phosphate ester salts, higher alcohol ethylene oxide adduct phosphoric ester salts, various betaine, higher alcohol ethylene oxide, polyethylene glycol fatty acid esters, polyol fatty acid ester, and the like.

The ion conductive material may be used alone or may be used in combination of two or more kinds.

Content of the ion conductive material is preferably in a range of 0.1 part by weight to 5.0 parts by weight and more preferably in a range of 0.5 part by weight to 3.0 parts by weight, with respect to 100 parts by weight of the rubber material, for example.

As the other additives, the materials which may be generally added to the elastic layer such as a foaming agent, a foaming auxiliary agent, a softener, a plasticizer, a hardener, a vulcanizing agent, a vulcanizing promoter, an antioxidant, a surfactant, a coupling agent, filler (silica or calcium carbonate), and the like are used, for example.

A thickness of the elastic layer 113 is, for example, preferably from 5 mm to 20 mm and more preferably from 5 mm to 15 mm.

Resin Layer

The resin layer 114A is the layer described above having a sea-island structure in which a diameter of an island portion is from 0.5 µm to 3 µm and in which elongation at break is from 20% to 180%.

A thickness of the resin layer 114A is preferably from 5 µm to 40 µm and more preferably from 10 µm to 30 µm, for example.

Resin Surface Layer

The resin surface layer 114B is the layer described above formed of (1) the layer which does not have a sea-island structure, or (2) the layer having the sea-island structure in which the diameter of the island portion is from 0.3 µm to 0.5 µm.

When the resin surface layer 114B is (1) the layer which does not have a sea-island structure, a thickness thereof is preferably from 1 µm to 3 µm and more preferably from 1 µm to 2 µm, from a viewpoint of suppressing generation of cracks. In addition, when the resin surface layer 114B is (2) the layer having the sea-island structure, the thickness thereof is preferably from 1 µm to 3 µm and more preferably from 2 µm to 3 µm, from the viewpoint of abrasion resistance.

Hereinabove, the roller member (secondary transfer roller 111) has been described as an example of the transfer member, but it is not limited thereto, and the transfer member may be the belt member.

In a case of the belt member, a belt member obtained by laminating the elastic layer and the resin layer (and resin surface layer if necessary) in this order may be used, or a belt member obtained by laminating a base material layer, the elastic layer, and the resin layer (and resin surface layer if necessary) in this order may be used.

Transfer Unit and Image Forming Apparatus

A transfer unit according to the exemplary embodiment is a transfer unit which includes the transfer member according to the exemplary embodiment, and an intermediate transfer member disposed to oppose the transfer member, and which transfers a toner image on a surface of the intermediate transfer member to a recording medium.

An image forming apparatus according to the exemplary embodiment includes an image holding member; a charging unit that charges the image holding member; an electrostatic charge image forming unit that forms an electrostatic charge image on a surface of the charged image holding member; a developing unit that develops the electrostatic charge image formed on the image holding member with an electrostatic charge image developer containing toner as a toner image; an intermediate transfer member to which the toner image formed on the surface of the image holding member is transferred; a primary transfer unit that performs primary transfer of the toner image formed on the surface of the image holding member to a surface of the intermediate transfer member; a secondary transfer unit that includes the transfer member according to the exemplary embodiment and performs secondary transfer of the toner image transferred to the surface of the intermediate transfer member to a recording medium; and a fixing unit that fixes the toner image transferred to the recording medium.

Hereinafter, the transfer unit and the image forming apparatus according to the exemplary embodiment will foe described with reference to FIG. 3. Herein, FIG. 3 is a schematic configuration diagram showing the image forming apparatus according to the exemplary embodiment.

Figure 3:
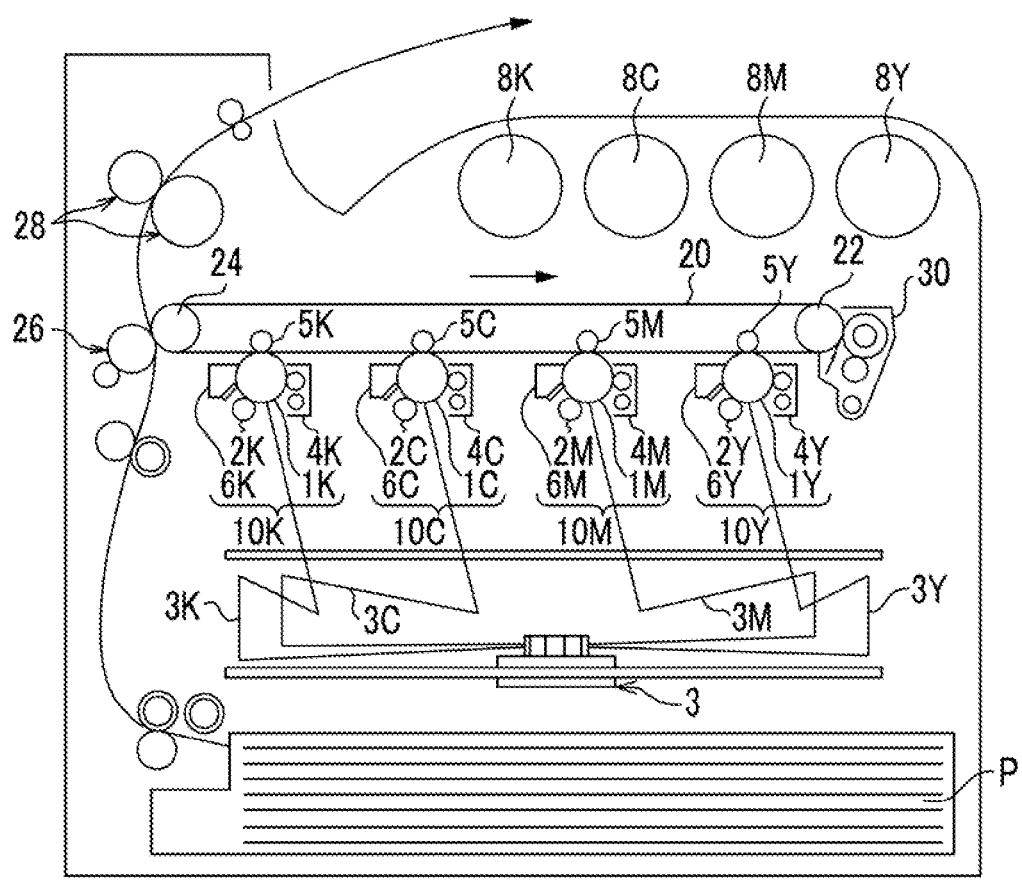
FIG. 3 is a schematic configuration diagram showing an image forming apparatus according to the exemplary embodiment.

The image forming apparatus shown in FIG. 3 is an intermediate transfer system apparatus including the transfer unit (transfer unit according to the exemplary embodiment) including the transfer member according to the exemplary embodiment on the secondary transfer unit.

In detail, as shown in FIG. 3, the image forming apparatus according to the exemplary embodiment includes first to fourth electrophotographic image forming units 10Y, 10M, 10C, and 10K (one example of the image forming unit) that output images of each color such as yellow (Y), magenta (M), cyan (C), and black (K) based on image data which is subject to color separation. The image forming units (hereinafter, simply referred to "units" in some case) 10Y, 10M, 10C, and 10K are provided in parallel to be separated from each other at predetermined intervals in a horizontal direction.

The units 10Y, 10M, 10C, and 10K may be a process cartridge which is detachable from the image forming apparatus.

An intermediate transfer belt 20 (one example of the intermediate transfer member) is provided to be extended through each unit, on the upper portion of units 10Y, 10M, 10C, and 10K in the drawing. The intermediate transfer belt 20 is provided to be wound around a back roller 24 which contacts with an inner surface of the intermediate transfer belt 20 and a driving roller 22 which are disposed to be separated from each other in a horizontal direction in the drawing, and is configured to travel in a direction from the first unit 10Y to the fourth unit 10K. A force is applied to the back roller 24 in a direction separating from the driving roller 22 by a spring or the like (not shown), and tension is applied to the intermediate transfer belt 20 which is wound around both rollers. An intermediate transfer member cleaning device 30 is provided to oppose the driving roller 22, on an outer periphery surface of the intermediate transfer belt 20.

Each toner of four colors, yellow, magenta, cyan, and black accommodated in toner cartridges 8Y, 8M, 8C, and 8K is supplied to each of developing devices 4Y, 4M, 4C, and 4K of each of units 10Y, 10M, 10C, and 10K.

Since the first to fourth units 10Y, 10M, 10C, and 10K have the same configuration, the first unit 10Y which is disposed upstream of a travelling direction of the intermediate transfer belt and forms a yellow image will be described representatively. The reference numerals with magenta (M), cyan (C), and black (K) are referred to the same portion as the first unit 10Y, instead of yellow (Y), and therefore description of the second to fourth units 10M, 10C, and 10K will be omitted.

The first unit 10Y includes a photoreceptor 1Y (one example of the image holding member). A charging device 2Y (for example, charging roller: one example of the charging unit) which charges a surface of the photoreceptor 1Y to a predetermined potential, an exposing device 3 (one example of the electrostatic charge image forming unit) which exposes the charged surface by a laser beam 3Y based on an image signal subject to color separation, to form an electrostatic charge image, a developing device 4Y (one example of the developing unit) which supplies charged toner to the electrostatic charge image to develop the electrostatic charge image, a primary transfer roller 5Y (one example of the primary transfer unit) which transfers the developed toner image onto the intermediate transfer belt 20, and a photoreceptor cleaning device 6Y (one example of the cleaning unit) which removes toner remaining on the surface of the photoreceptor 1Y after the primary transfer are placed around the photoreceptor 1Y in order.

The primary transfer roller 5Y is placed inside of the intermediate transfer belt 20 and is provided in a position opposing the photoreceptor 1Y. A bias power supply (not shown) which applies primary image-transferring bias is connected to each of the primary transfer rollers 5Y, 5M, 5C, and 5K. Each bias power supply changes image-transferring bias to be applied to each primary transfer roller, by control of a control unit (not shown).

Hereinafter, an operation of forming a yellow image in the first unit 10Y will be described. First, the surface of the photoreceptor 1Y is charged to a potential of approximately −600 V to −800 V by the charging device 2Y, before the operation.

The photoreceptor 1Y is formed by laminating a photosensitive layer on a conductive (for example, $1 \times 10^{-6}$ Ωcm or less of volume resistivity at 20° C.) substrate. The photosensitive layer normally has high resistivity (resistivity of general resin), but has a property that specific resistance of a portion to which the laser beam is emitted changes if the laser beam 3Y is emitted. Herein, the laser beam 3Y is output to the charged surface of the photoreceptor 1Y through the exposing device 3, according to yellow image data which is transmitted from the control unit (not shown). The laser beam 3Y is emitted to the photosensitive layer of the surface of the photoreceptor 1Y, and accordingly, an electrostatic charge image having a yellow print pattern is formed on the surface of the photoreceptor 1Y.

The electrostatic charge image is an image which is formed on the surface of the photoreceptor 1Y by charging, and is a so-called negative latent image which is formed as the specific resistance of the irradiated portion of the photosensitive layer with the laser beam 3Y decreases, an electrical charge charged on the surface of the photoreceptor 1Y flows, and meanwhile the charge on the portion to which the laser beam 3Y is not emitted remains.

Accordingly, the electrostatic charge image which is formed on the photoreceptor 1Y rotates to a predetermined development position according to the travelling of the photoreceptor 1Y. The electrostatic charge image on the photoreceptor 1Y is visualized (developed) by the developing device 4Y in this development position.

An electrostatic charge image developer including at least a yellow toner and a carrier is accommodated in the developing device 4Y, for example. The yellow toner is friction-charged by agitating in the developing device 4Y, and has a charge with the same polarity (negative polarity) as the charge which is charged on the photoreceptor 1Y and is held on a developer roller (developer holding member). As the surface of the photoreceptor 1Y passes through the developing device 4Y, the yellow toner is electrostatically attached to an erased latent image portion on the surface of the photoreceptor 1Y, and a latent image is developed by the yellow toner. Then, the photoreceptor 1Y on which the yellow toner image is formed continuously travels at a predetermined speed, and the toner image which is developed on the photoreceptor 1Y is carried to a predetermined primary transfer position.

When the yellow toner image on the photoreceptor 1Y is carried to the primary transfer position, the primary image-transferring bias is applied to the primary transfer roller 5Y, an electrostatic force from the photoreceptor 1Y towards the primary transfer roller 5Y acts on the toner image, and the toner image on the photoreceptor 1Y is transferred, onto the intermediate transfer belt 20. The image-transferring bias applied at that time has an opposite polarity (+) to the polarity (−) of the toner, and is controlled to, approximately +10 μA by the control unit (not shown) in the first unit 10Y, for example.

Meanwhile, the toner remaining on the photoreceptor 1Y is removed and collected by the cleaning device 6Y.

The primary image-transferring bias to be applied to the primary transfer rollers 5M, 5C, and 5K of the second unit 10M and the subsequent units is controlled similarly to the first unit.

Accordingly, the intermediate transfer belt 20 to which the yellow toner image is transferred in the first unit 10Y is carried through the second to fourth units 10M, 10C, and 10K in order, and each color toner image is multi-transferred in a superimposed manner.

The intermediate transfer belt 20 to which the toner images with four colors is multi-transferred in a superimposed manner through the first to fourth units, reaches a secondary transfer portion which is configured with the intermediate transfer belt 20, the back roller 24 which contacts with the inner surface of the intermediate transfer belt, and the secondary transfer roller 26 (one example of secondary transfer unit, the transfer member according to the exemplary embodiment) which is placed on the image holding surface side of the intermediate transfer belt 20.

Meanwhile, recording paper P (one example of recording medium) is fed to a gap in which the secondary transfer roller 26 contacts with the intermediate transfer belt 20 with pressure, through a supplying mechanism at predetermined timing, and the secondary image-transferring bias is applied to the back roller 24. The image-transferring bias applied at that time has the same polarity (−) as the polarity (−) of the toner, an electrostatic force from the intermediate transfer belt 20 towards the recording paper P acts on the toner image, and the toner image on the intermediate transfer belt 20 is transferred onto the recording paper P. The secondary image-transferring bias at that time is determined based on resistivity detected by a resistivity detecting unit (not shown) which detects the resistivity of the secondary transfer portion, and is voltage-controlled.

After that, the recording paper P is sent to a nipping portion of a pair of fixing rollers of a fixing device 28 (one example of the fixing unit), the toner image is heated, the toner image with superimposed colors is melted, and the toner image is fixed onto the recording paper P.

The recording paper F on which the fixation of a color image is completed, is discharged towards a discharging unit, and a series of a color image forming operations ends.

The image forming apparatus according to the exemplary embodiment is not limited to the configuration described above, and a well-known intermediate transfer system image forming apparatus is applied, as long as it includes the transfer unit (transfer unit according to the exemplary embodiment) including the transfer member according to the exemplary embodiment.

In the configuration, the image forming apparatus using the transfer member according to the exemplary embodiment as the secondary transfer roller is shown, but the transfer member according to the exemplary embodiment may be used as the primary transfer roller.

In addition, the image forming apparatus according to the exemplary embodiment is not limited to the intermediate transfer system image forming apparatus, and a well-known direct transfer system image forming apparatus may be used.

Herein, in all exemplary embodiments, as the recording paper (recording medium) P for transferring the toner image, plain paper which is used in an electrophotographic copying machine or printer is used, for example. As the recording medium, an OHP sheet is also used, in addition to the recording paper P.

EXAMPLES

Hereinafter, the exemplary embodiment will be described in detail with reference to Examples, but the exemplary embodiment is not limited to Examples.

In the following description, "part" and "%" are based on weight unless otherwise noted.

Manufacture of Elastic Layer-Attached Roller A 60 parts of epichlorohydrin rubber (EPICHLOMER CG-102 manufactured by Daiso CO., Ltd.) having excellent ion conductivity by containing an ethylene oxide group, and 30 parts of acrylonitrile-butadiene rubber (Nipol DN-219 manufactured by ZEON CORPORATION) are mixed with each other, 1 part of sulfur (200 mesh manufactured by Tsurumi Chemical Co., Ltd.) and 1.5 parts of a vulcanizing promoter (NOCCELER M manufactured by Ouchi Shinko Chemical Industrial Co., Ltd.) are added thereto and kneaded in an open roll, to obtain a mixture. Next, this mixture is wound around a SUS shaft (support) having a diameter of 14 mm. Then, the SUS shaft is heated to 160° C. as a source of heat, and the mixture wound around the shaft is vulcanized for 2 hours to form an elastic layer on the SOS shaft. An outer periphery surface of this elastic layer is polished to have an outer diameter of 28 mm (thickness of the elastic layer of 7 mm) and an elastic layer-attached roller A is obtained.

Preparation of Curing Agent

The following three curing agents (solutions) are prepared.

Curing agent A: DURANATE TKA-100 (manufactured by Asahi Kasei Corporation, NCO content of 23.1%, solid content of 100%) is diluted with butyl acetate, and solution with solid content of 10% is prepared.

Curing agent B: DURANATE TPA-100 (manufactured by Asahi Kasei Corporation, NCO content of 21.7%, solid content of 100%) is diluted with butyl acetate, and a solution with solid content of 10% is prepared.

Curing agent C: DURANATE E402-80B (manufactured by Asahi Kasei Corporation, NCO content of 7.3%, solid content of 80%, solvent of butyl acetate) is diluted with butyl acetate, and a solution with solid content of 40% is prepared.

Manufacturing of Secondary Transfer Roller

Manufacturing of Secondary Transfer Roller (1)

The curable resin "ZEFFLE GK-570 (manufactured by DAIKIN INDUSTRIES, solid content of 60%)" is diluted with butyl acetate (solvent) to have the solid content of 20%, 20 parts of carbon black "Special Black 4A (manufactured by Evonik Degussa GmbH, particle size) is added, to this diluted solution with respect to 100 parts of curable resin, and this solution is subjected to a dispersion process (pressure=200 N/mm$^2$, collision frequency=5 passes), using a jet mill disperser "Geanus PY (manufactured by Geanus Co., Ltd.)", and a resin solution is obtained.

After that, the curing agents are mixed with the resin solution so as to have 21.4 parts of the curing agent A (noted as "A" in a table) and 13.5 parts of the curing agent C (noted as "C" in a table), with respect to 100 parts of the resin solution. Then, 10 parts of butyl acetate is added to the resin solution, and a coating solution for a resin layer is obtained.

The obtained coating liquid for a resin layer is applied with respect to the surface of the elastic layer-attached roller A by the flow coating method, the coating solution is heated and fired at 140° C. for 20 minutes, and a resin layer having a thickness of 14 μm is formed.

With the steps described above, a secondary transfer roller (1) is manufactured.

Manufacture of Secondary Transfer Rollers (2) and (3) and (C1) to (C4)

Secondary transfer rollers (2) and (3) and (C1) to (C4) are manufactured in the same manner as in the secondary transfer roller (1), except for changing the composition of the coating solution for a resin layer (types and amount of the curing agents, and amount of solvent added to the resin solution) according to Table 1.

Manufacturing of Secondary Transfer Roller (4)

A resin surface layer is formed on the resin layer of the secondary transfer roller (2) by the following method.

That is, the curable resin "ZEFFLE GK 570 (manufactured by DAIKIN INDUSTRIES, Ltd., solid content of 60%)" is diluted with butyl acetate (solvent) to have the solid content of 20%. 20 parts of carbon black "Special Black 4A (manufactured by Evonik Degussa GmbH, particle size) is added to this diluted solution with respect to 100 parts of curable resin, and this solution is subjected to a dispersion process (pressure=200 N/mm$^2$, collision frequency=5 passes), using a jet mill disperser "Geanus PY (manufactured by Geanus Co., Ltd.)", and a resin solution is obtained.

After that, the curing agent is mixed with the resin solution so as to have 42.8 parts of the curing agent A (noted as "A" in a table), with respect to 100 parts of the resin solution. This is set as the coating solution for a resin surface layer.

The obtained coating solution for a resin surface layer is applied with respect to the surface of the resin layer of the secondary transfer roller (2) by the flow coating method, the coating solution is heated and fired at 140° C. for 20 minutes, and a resin surface layer having a thickness of 1 μm is formed.

With the steps described above, a secondary transfer roller (4) is manufactured.

Manufacturing of Secondary Transfer Roller (5)

A secondary transfer roller (5) is manufactured in the same manner as in the secondary transfer roller (4), except for setting a film thickness of the resin surface layer to 3 μm.

Manufacturing of Secondary Transfer Rollers (6) and (7)

Secondary transfer rollers (6) and (7) are manufactured in the same manner as in the secondary transfer roller (4), except for changing the composition of the coating solution for the resin surface layer (types and amount of the curing agents, and amount of solvent added to the resin solution) according to Table 2.

Manufacturing of Secondary Transfer Roller (8)

The resin surface layer is formed on the resin layer of the secondary transfer roller (3) by the following method.

That is, a secondary transfer roller (8) is manufactured in the same manner as in the formation method of the resin surface layer of the secondary transfer roller (4), except for changing the composition of the coating solution for the resin surface layer (types and amount of the curing agents, and amount of solvent added to the resin solution) according to Table 2.

Manufacturing of Secondary Transfer Roller (9)

The resin surface layer is formed on the resin layer of the secondary transfer roller (1) by the following method.

That is, a secondary transfer roller (9) is manufactured in the same manner as in the formation method of the resin surface layer of the secondary transfer roller (4), except for changing the composition of the coating solution for the resin surface layer (types and amount of the curing agents, and amount of solvent added to the resin solution) according to Table 2.

Manufacturing of Secondary Transfer Roller (C5)

The same resin surface layer (film thickness of 3 μm) as the resin surface layer of the secondary transfer roller (5) is formed on the resin layer of the secondary transfer roller (C2), and thereby a secondary transfer roller (C5) is manufactured.

Manufacturing of Secondary Transfer Roller (C6)

The same resin surface layer as the resin surface layer of the secondary transfer roller (9) is formed on the resin layer of the secondary transfer roller (C4), and thereby a secondary transfer roller (C6) is manufactured.

Examples 1 to 9 and Comparative Examples 1 to 6

The manufactured secondary transfer rollers (1) to (9) and (C1) to (C6) are set as secondary transfer rollers of Examples 1 to 9 and Comparative Examples 1 to 6, respectively.

Evaluation is performed as follows using the secondary transfer rollers. Evaluation results are collectively shown in Table 1 and Table 2.

Evaluation of Physical Properties

The diameter of the island portion in the resin layer, the presence and absence of the sea-island structure in the resin surface layer, the diameter of the island portion of the resin surface layer, and the Young's modulus of the outermost surface of each manufactured secondary transfer roller are measured with the above-described method.

Herein, the single layer of the resin layer, or the laminated body of the resin layer and the resin surface layer is coated on the elastic layer of a measurement reference roller having Asker C type hardness of 90° which is manufactured in the same manner as the elastic layer-attached roller A except for changing the combination amount of carbon black to 15 parts, by using the coating solution used in the manufacturing of each secondary transfer roller, to form the outermost surface, and the measurement of Young's modulus is performed using this outermost surface as a measurement sample.

Break Elongation Test

The elongation at break of the resin layer of each of the manufactured secondary transfer rollers is measured as follows.

That is, first, the coating solution for each resin layer of Examples and Comparative Examples is spray-coated on an ethylene-propylene rubber sheet (thickness of 500 μm) and fired at 140° C. for 20 minutes, so that the resin layer has a film thickness of 14 μm after firing.

The obtained rubber sheet having the resin layer is cut out to have a width of 5 mm and a length of a measurement portion of 40 mm, and thereby a test piece is obtained.

The obtained test piece is pulled under the rate condition of a rate of 10 mm/min by using a tensile tester MODEL-1605 N manufactured by AIKOH ENGINEERING CO., LTD., and the elongation when the resin layer is broken is observed and recorded. The rubber sheet used as a base material is elongated more than the resin layer, and therefore the elongation thereof is visually observed.

The test environment is a laboratory environment of 23° C.±5° C.

The amount of elongation is divided by the length of the measurement portion (40 mm) and calculation of the elongation at break (%) is expressed in percentage.

Evaluation of Cracks

Figure 4:
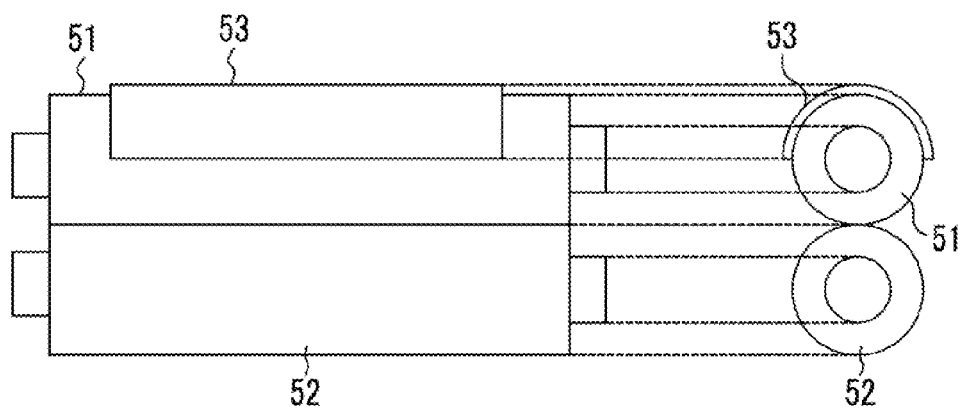
FIG. 4 is an explanatory view for illustrating an evaluation method of cracks on a secondary transfer roller of Examples.

An evaluation device in which a polyethylene terephthalate film (PET film) having a thickness of 260 μm is wound on the outer periphery surface of the back roller in an area to be a half of the entire periphery, except both end portions in an axial direction in a state where the secondary transfer roller and the back roller contacts with each other with pressure of a load of 5 kg is prepared (see FIG. 4). In FIG. 4, reference numeral 51 denotes a counter roller, reference numeral 52 denotes the secondary transfer roller, and reference numeral 53 denotes the PET sheet.

The secondary transfer roller is rotatably driven at a rotating speed of 175 rpm for 10 hours, and then the state of generation of cracks on the surface of the secondary transfer roller is visually observed. Evaluation criteria are as follows.

Evaluation Criteria of Cracks

G1: No cracks are observed on the outer periphery surface of the secondary transfer roller.

G2: Cracks are observed on the outer periphery surface of the secondary transfer roller along the axial direction, but the number of cracks is 5 or less on the periphery.

NG: Significant number of cracks is clearly observed on the outer periphery surface of the secondary transfer roller along the axial direction.

Evaluation of Blade Turned-up

In the image forming apparatus having the configuration as shown in FIG. 3, a folder of the secondary transfer roller is processed so that a polyurethane rubber cleaning blade used for photoreceptor in Docu Color 1450GA manufactured by Fuji Xerox Co., Ltd. is attached thereto in the same conditions. Such a polyurethane rubber cleaning blade is used as the cleaning blade for the secondary transfer roller, and a tester in which the secondary transfer roller is disposed so as to come into contact with this cleaning blade is manufactured.

In the tester, the cleaning blade and the secondary transfer roller are settled for 24 hours still in the environment of 28° C. and 85%, and then printing of a blank sheet without a toner image is started.

The blade turned-up after starting this printing is visually observed. Evaluation criteria are as follows.

Evaluation Criteria of Blade Turned-up

G1: 1000 sheets are printed, but no blade turned-up is observed.

G2: The blade turned-up is observed when less than 1000 sheets are printed.

NG: The blade turned-up is clearly observed from the initial stage of the printing.

Measurement of Resistance Decrease Amount

An evaluation device in which, in a state where the secondary transfer roller and the back roller come in contact with each other with pressure of a load of 5 kg, 610E power-source manufactured by Trek Japan is connected between both rollers is prepared.

In this evaluation device, a voltage is set such that a current of 100 μA flows between both rollers, electrical connection is performed at a low voltage, and the secondary transfer roller is rotatably driven at the rotating speed of 175 rpm for 10 hours. The test is performed in a low temperature and low humidity environment of 10° C. and 30%.

A volume electric resistance value of the secondary transfer roller after the rotation current test for 10 hours, and a volume electric resistance value of the secondary transfer roller before the current test are respectively expressed in common logarithm, and a difference between those is calculated to obtain the resistance decrease amount.

Herein, a measurement method of the volume electric resistance value will be described with reference to FIG. 5.

As shown in FIG. 5, in a state where a secondary transfer roller (conductive roller) 60 is placed on a metal plate 70 and loads of 500 g are applied to two portions of arrows A1 and A2 on both ends of a core bar 50, an applied voltage of 1000 V is applied between the core bar 50 and the metal plate 70 in the environment of a temperature of 22° C. and humidity of 55% RH, a current value I(A) is read after 10 seconds, and a volume resistance value (R) is calculated with a formula "R=V/I". The measurement and calculation are performed at 4 points by rotating the secondary transfer roller (conductive roller) 60 by 90° C. in a circumferential direction and an average value thereof is set as the volume resistance value (R) of the secondary transfer roller.

The volume resistance value is measured as described above, and it is found that the volume resistance value of the secondary transfer roller of Comparative Example 6 is excessively low, and therefore the secondary transfer roller may not be used as a secondary transfer roller.

As described above, it is found the volume resistance value of the secondary transfer roller of Comparative Example 6 is excessively low, and therefore it may not be used as a secondary transfer roller.

Hereinafter, details of abbreviation in Tables are shown.

Curable Resin

ZEFFLE GK-570: manufactured by DAIKIN INDUSTRIES, Ltd., hydroxyl value of 60 mgKOH, solid content of 60%, solvent: butyl acetate Carbon Black SB4A: "Special Black 4A (manufactured by Evonik Degussa GmbH)", average particle diameter (arithmetic average diameter obtained by observing carbon black particles with an electron microscope)=25 nm

TABLE 1

| Secondary transfer roller No. | | Ex. 1 (1) | Ex. 2 (2) | Ex. 3 (3) | Com. Ex. 1 (C1) | Com. Ex. 2 (C2) | Com. Ex. 3 (C3) | Com. Ex. 4 (C4) |
|---|---|---|---|---|---|---|---|---|
| Curable resin | Type | | | | ZEFFLE GK-570 | | | |
| | Content (part) | | | | 100 | | | |
| Carbon black | Type | | | | SB4A | | | |
| | Particle size | | | | 25 nm | | | |
| | Content (part) | | | | 20 | | | |
| Dispersion method | | | | | JetMill | | | |
| Curing agent | A (part): 10% diluted solution | 21.4 | 21.4 | — | — | 42.8 | 21.4 | 21.4 |
| | B (part): 10% diluted solution | — | — | 22.8 | — | — | — | — |
| | C (part): 40% diluted solution | 13.5 | 13.5 | 13.5 | 27.1 | — | 13.5 | 13.5 |
| Solvent | Type | | | | Butyl acetate | | | |
| | Added amount (part) | 10 | 25 | 25 | 0 | 0 | 0 | 40 |
| Physical properties | Diameter of island portion (μm) | 1 | 3 | 3 | None | None | None | 5 |
| | Elongation at break (%) | 150 | 150 | 140 | 220 | 120 | 140 | 150 |
| | Young's modulus (MPa) | 550 | 540 | 550 | 90 | 640 | 550 | 530 |
| Evaluation | Cracks | G1 | G1 | G1 | G1 | NG | NG | G1 |
| | Blade tuned-up | G1 | G1 | G1 | NG | G1 | G1 | G2 |
| | Resistance decrease amount (logΩ) | 0 | 0.2 | 0.2 | 0 | 0 | 0 | 5 |

TABLE 2

| Secondary transfer roller No. | | | Ex. 4 (4) | Ex. 5 (5) | Com. Ex. 5 (C5) | Ex. 6 (6) | Ex. 7 (7) | Ex. 8 (8) | Ex. 9 (9) | Com. Ex. 6 (C6) |
|---|---|---|---|---|---|---|---|---|---|---|
| Common component | Curable resin | Type | | | | ZEFFLE GK-570 | | | | |
| | | Content (part) | | | | 100 | | | | |
| | Carbon black | Type | | | | S84A | | | | |
| | | Particle size | | | | 25 nm | | | | |
| | | Content (part) | | | | 20 | | | | |
| Dispersion method | | | | | | JetMill | | | | |
| Resin layer | Curing agent | A (part): 10% diluted solution | 21.4 | 21.4 | 42.8 | 21.4 | 21.4 | — | 21.4 | 21.4 |
| | | B (part): 10% diluted solution | — | — | — | — | — | 22.8 | — | — |
| | | C (part): 40% diluted solution | 13.5 | 13.5 | — | 13.5 | 13.5 | 13.5 | 13.5 | 13.5 |
| | Solvent | Type | | | | Butyl acetate | | | | |
| | | Added amount (part) | 25 | 25 | 0 | 25 | 25 | 25 | 10 | 40 |
| Resin surface layer | Curing agent | A (part): 10% diluted solution | 42.8 | 42.8 | 42.8 | 21.4 | 21.4 | 21.4 | — | — |
| | | B (part): 10% diluted solution | — | — | — | — | — | — | 22.8 | 22.8 |
| | | C (part): 40% diluted solution | — | — | — | 13.5 | 13.5 | 13.5 | 13.5 | 13.5 |
| | Solvent | Type | | | | Butyl acetate | | | | |
| | | Added amount (part) | 0 | 0 | 0 | 25 | 10 | 5 | 5 | 5 |
| Physical properties | Diameter of island portion of resin layer (μm) | | 3 | 3 | 0 | 3 | 3 | 3 | 1 | 5 |
| | Diameter of island portion of resin surface layer (μm) | | None | None | None | 3 | 1 | 0.5 | 0.5 | 0.5 |
| | Thickness of resin surface layer (μm) | | 1 | 3 | 3 | 3 | 3 | 3 | 3 | 3 |
| | Elongation at break (%) | | 140 | 130 | 120 | 140 | 140 | 150 | 140 | 150 |
| | Young's modulus (MPa) | | 570 | 580 | 640 | 540 | 550 | 550 | 540 | 550 |
| Evaluation | Cracks | | G2 | G2 | NG | G1 | G1 | G1 | G1 | G1 |
| | Blade turned-up | | G1 | G1 | G1 | G1 | G1 | G1 | G1 | G1 |
| | Resistance decrease amount (LogΩ) | | 0 | 0 | 0 | 3 | 1 | 0 | 0 | 0* |

From the results described above, it is found that the secondary transfer rollers of Examples have excellent results in both evaluations of the generation of cracks and the blade turned-up, compared to Comparative Examples 1 to 5.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transfer member comprising:
a support;
an elastic layer; and
a resin layer having a sea-island structure on the elastic layer,
wherein elongation at break of the resin layer is from 20% to 180%, and an average diameter of an island portion thereof is from 0.5 μm to 3 μm.

2. The transfer member according to claim 1, further comprising:
a resin surface layer on the resin layer,
wherein the resin surface layer has a sea-island structure, and an average diameter of an island portion is from 0.3 μm to 0.5 μm.

3. The transfer member according to claim 1, further comprising:
a resin surface layer on the resin layer,
wherein the resin surface layer does not have a sea-island structure.

4. The transfer member according to claim 2,
wherein a thickness of the resin surface layer is from 1 μm to 3 μm.

5. The transfer member according to claim 3,
wherein a thickness of the resin surface layer is from 1 μm to 3 μm.

6. The transfer member according to claim 1,
wherein a thickness of the resin layer is from 5 μm to 40 μm.

7. The transfer member according to claim 1,
wherein a content ratio of the island portion of the resin layer is in a range of 5 volume % to 25 volume % with respect to the entire resin layer.

8. The transfer member according to claim 1,
wherein the resin layer is formed of a curable resin and two or more kinds of isocyanate compounds.

9. A method of manufacturing the transfer member of claim 1, comprising:
coating a coating solution including a curable resin and two or more kinds of isocyanate compounds on the elastic layer; and
drying a coated film obtained in the coating of the coating solution while controlling a drying rate.

10. A transfer unit comprising:
the transfer member according to claim 1; and
an intermediate transfer member that is disposed to oppose the transfer member,
wherein the transfer unit transfers a toner image on a surface of the intermediate transfer member to a recording medium.

11. An image forming apparatus comprising:
an image holding member;
a charging unit that charges the image holding member;
an electrostatic charge image forming unit that forms an electrostatic charge image on a surface of the charged image holding member;
a developing unit that develops the electrostatic charge image formed on the image holding member with an electrostatic charge image developer containing toner as a toner image;
an intermediate transfer member to which the toner image formed on the surface of the image holding member is transferred;
a primary transfer unit that performs primary transfer of the toner image formed on the surface of the image holding member to a surface of the intermediate transfer member;
a secondary transfer unit that includes the transfer member according to claim 1 and performs secondary transfer of the toner image transferred to the surface of the intermediate transfer member to a recording medium; and
a fixing unit that fixes the toner image transferred to the recording medium.

12. A roller comprising:
a support;
an elastic layer; and
a resin layer having a sea-island structure on the elastic layer,
wherein elongation at break of the resin layer is from 20% to 180%, and an average diameter of an island portion thereof is from 0.5 μm to 3 μm.

13. The roller according to claim 12, further comprising:
a resin surface layer on the resin layer,
wherein the resin surface layer has a sea-island structure, and an average diameter of an island portion is from 0.3 μm to 0.5 μm.

* * * * *